(12) United States Patent
Xia et al.

(10) Patent No.: US 8,279,829 B2
(45) Date of Patent: Oct. 2, 2012

(54) MULTICAST FAST HANDOVER

(75) Inventors: Yangsong Xia, Nanjing (CN); Behcet Sarikaya, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 886 days.

(21) Appl. No.: 11/861,138

(22) Filed: Sep. 25, 2007

(65) Prior Publication Data

US 2008/0084847 A1    Apr. 10, 2008

Related U.S. Application Data

(60) Provisional application No. 60/828,807, filed on Oct. 10, 2006.

(51) Int. Cl.
*H04W 4/00* (2009.01)
*H04W 36/00* (2009.01)

(52) U.S. Cl. ........ 370/331; 455/436; 455/438; 455/439; 455/442

(58) Field of Classification Search .......... 370/331; 709/225, 228; 713/153, 158
See application file for complete search history.

(56) References Cited

U.S. PATENT DOCUMENTS

| | | | |
|---|---|---|---|
| 6,154,463 A * | 11/2000 | Aggarwal et al. | 370/408 |
| 7,693,109 B2 * | 4/2010 | Han et al. | 370/331 |
| 7,787,422 B2 * | 8/2010 | Jang et al. | 370/331 |
| 2003/0095523 A1 | 5/2003 | Korus et al. | |
| 2006/0034225 A1 * | 2/2006 | Jung et al. | 370/331 |
| 2006/0036733 A1 * | 2/2006 | Fujimoto et al. | 709/225 |
| 2006/0120327 A1 * | 6/2006 | Suh | 370/331 |
| 2006/0159050 A1 | 7/2006 | Kim et al. | |
| 2007/0008930 A1 * | 1/2007 | Jang et al. | 370/331 |
| 2007/0113075 A1 * | 5/2007 | Jo et al. | 713/158 |
| 2008/0151808 A1 * | 6/2008 | O'Neill | 370/312 |
| 2008/0229095 A1 * | 9/2008 | Kalimuthu et al. | 713/153 |
| 2009/0147751 A1 * | 6/2009 | Gurusamy et al. | 370/331 |
| 2010/0131663 A1 * | 5/2010 | Lee et al. | 709/228 |

FOREIGN PATENT DOCUMENTS

CN    1801776 A    7/2006

(Continued)

OTHER PUBLICATIONS

Wu et al. (An Agent-Based Scheme for Efficient Multicast Application in Mobile Networks; Lecture Notes in Computer Science, 2005).*

(Continued)

*Primary Examiner* — Ayaz Sheikh
*Assistant Examiner* — Sori Aga
(74) *Attorney, Agent, or Firm* — Slater & Matsil, L.L.P.

(57) ABSTRACT

A network component comprising a processor configured to implement a method comprising receiving a multicast listening state (MLS) report comprising a multicast state data from a mobile node (MN), sending the multicast state data to an access router (AR), establishing a tunnel with the AR, and forwarding at least one multicast data stream associated with the multicast state data to the AR via the tunnel. Also disclosed is an AR configured to implement a method comprising receiving a multicast state data for a MN, evaluating the multicast state data, indicating whether the multicast state data is supported by the AR, establishing a tunnel with a second AR, and receiving at least one multicast data stream associated with the multicast state data from the second AR via the tunnel.

8 Claims, 4 Drawing Sheets

FOREIGN PATENT DOCUMENTS

EP          1708425 A     10/2006

OTHER PUBLICATIONS

European Search Report mailed Sep. 11, 2009; International Application No. 0781708.0, 8 pages.

Koodli, Rajeev, "Fast Handovers for Mobile IPv6," The IETF Trust, 61 pages, Jul. 9, 2007.

Suh, Kyungjoo et al., "Fast Multicast Protocol for Mobile IPv6 in the Fast Handovers Environments," IETF, 14 pages, Jan. 2004.

Vida, R. et al., "Multicast Listener Discovery Version 2 (MLDv2) for IPv6," RFC 3810, The Internet Society, 58 pages, Jun. 2004.

Suh et al., "Fast Multicast Protocol for Mobile IPv6 in the fast handover environments", IETF MIPSHOP Working Group Internet Draft, Jan. 2004, p. 3, lines 18-33, p. 7 lines 16-24, p. 6 lines 27-42 and p. 2 lines 3-5.

Written Opinion of the International Searching Authority, International Application No. PCT/CN2007/070827, Date of mailing: Jan. 10, 2008, 5 pages.

First Chinese Office Action, Chinese Application No. 200780035500.7, Date of mailing: Apr. 2, 2010, 8 pages.

Second Chinese Office Action, Chinese Application No. 200780035500.7, Mailing date: Oct. 19, 2010, 8 pages.

European Search Report mailed Dec. 13, 2011; International Application No. 07817018.0, 5 pages.

Third Chinese Office Action, Chinese Application No. 200780035500.7, Mailing date: Mar. 2, 2011, 5 pages.

Fourth Chinese Office Action, Chinese Application No. 200780035500.7, Mailing date: Jun. 15, 2011, 5 pages.

\* cited by examiner

MULTICAST FAST HANDOVER

CROSS-REFERENCE TO RELATED APPLICATIONS

This application claims priority to U.S. Provisional Application Ser. No. 60/828,807 filed Oct. 10, 2006 by Xia et al. and entitled "FMIPv6 Extension for Multicast Handover," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication networks comprise several components that work together to allow a mobile node (MN) to communicate with a service provider. For example, a network may use a plurality of routers to interconnect the service provider and the MN. The routers route data packets between the service provider, the MN, and/or other components, thereby allowing the MN and service provider to communicate with one another. One particular type of router, an access router (AR), may be configured with wireless communication devices that allow it to communicate directly with the MN. Each AR has a limited coverage area, thus the network may contain a plurality of ARs in an overlapping configuration, thereby providing wireless access coverage to the MN as the MN moves from place to place.

One problem associated with existing ARs is that there is a delay associated with the handover of the MN from one AR to another AR. Specifically, there is a time delay between the time when the MN discontinues communications with a previous AR and when the MN establishes communications with the new AR. Such delays may be significant if the MN has to move from one coverage area to another, e.g. when the ARs do not have overlapping coverage areas. If the MN is receiving a multicast data stream, such as internet protocol (IP) television, the delay can cause the MN to not receive or otherwise miss a significant portion of the multicast data stream.

SUMMARY

In a first aspect, the disclosure includes a network component comprising a processor configured to implement a method comprising receiving a multicast listening state (MLS) report comprising a multicast state data from a MN, sending the multicast state data to an AR, establishing a tunnel with the AR, and forwarding at least one multicast data stream associated with the multicast state data to the AR via the tunnel.

In a second aspect, the disclosure includes a method comprising obtaining a multicast state data for a MN, sending the multicast state data to an AR, informing the MN of the multicast service capability of the AR, establishing a tunnel with the AR, and forwarding at least one multicast data stream associated with the multicast state data to the AR via the tunnel.

In a third aspect, the disclosure includes an AR configured to implement a method comprising receiving a multicast state data for a MN, evaluating the multicast state data, indicating whether the multicast state data is supported by the AR, establishing a tunnel with a second AR, and receiving at least one multicast data stream associated with the multicast state data from the second AR via the tunnel.

In a fourth aspect, the disclosure includes a method comprising sending a MLS query to a mobile node, wherein the MLS query comprises a designated multicast listener query.

In a fifth aspect, the disclosure includes a method comprising sending a MLS advertisement to a mobile node, wherein the MLS advertisement comprises the multicast service capability of an access router.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for improving the handover of a MN receiving multicast data streams. Specifically, when the handover of the MN is likely or imminent, the MN's PAR acquires the MN's multicast state data and forwards the MN's multicast state data to the NAR to which the MN will be handed over. Upon receipt of the multicast state data, the NAR can prepare for the arrival of the MN, for example by building the multicast delivery trees if such trees do not already exist. In addition, the PAR tunnels the MN's multicast data streams to the NAR where they are buffered until the MN connects to the NAR. By implementing the disclosed methods, the system may reduce the delay associated with the handover of the MN and/or reduce or substantially eliminate the possibility that the MN will not receive some of the multicast packets during a handover. Moreover, the system may reduce the handover delay without the use of any specialized mobility signaling.

Figure 1:
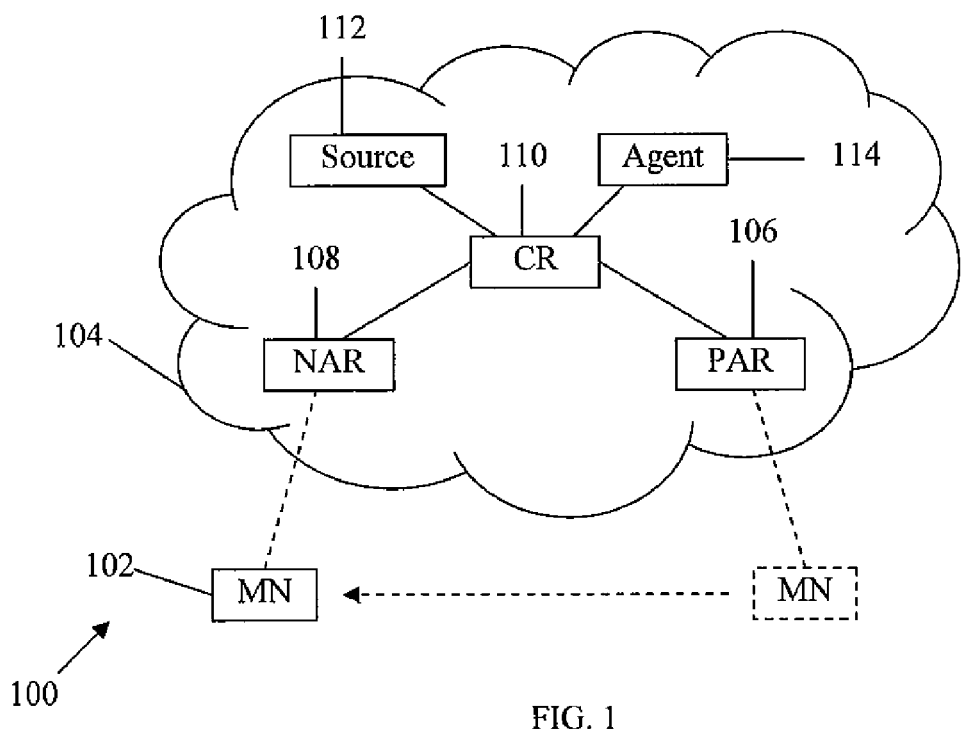
FIG. 1 is a schematic diagram of an embodiment of a wireless communication system.

FIG. 1 illustrates an embodiment of a wireless communications system 100. The wireless communications system 100 may include a MN 102, a network 104, at least one source, 112, at least one agent 114, a core router (CR 110), a PAR 106, and a NAR 108. The PAR 106, NAR 108, source 112, and agent 114 may communicate with each other either directly or via the CR 110, as shown in FIG. 1. In addition, the PAR 106 and the NAR 108 may communicate with the MN 102, preferably via wireless connection. Also shown in FIG. 1, the MN 102 may migrate from a position where it is in communication with the PAR 106 to a position where it is in communication with the NAR 108. The handover associated with such migration is discussed in further detail below.

The MN 102 may be any device that accesses or communicates, directly or indirectly, with the PAR 106 and the NAR 108. Specifically, the MN 102 may be a wireless device that communicates with the source 112 and/or agent 114 via the PAR 106 and the NAR 108. If the PAR 106 and/or the NAR 108 implement IP version 6 (IPv6), then the MN 102 may be an IPv6 host. Examples of suitable MNs 102 include personal digital assistants (PDAs), portable computers, such as laptop, notebook, and tablet computers, cellular telephones, and other mobile communication or computing systems. Other examples of suitable MNs 102 include other types of computers, such as desktop, workstation, and kiosk computers using a wireless network connection. Alternatively, the MN 102 may be any other type of computer or communication device known to persons of ordinary skill in the art.

The network 104 may be any network suitable for facilitating communications between the components described herein. For example, the network 104 may be an access service network (ASN), a connectivity service network (CSN), a plurality of ASNs or CSNs, or combinations thereof. The network 104 may include infrastructure to carry out communications with a plurality of devices and networks, such as wireless access points (WAPs), base transceiver stations (BTSs), base station controllers (BSCs), mobile access gateways (MAGs), local mobility agents (LMAs), routers, switches, bridges, and/or routing logic circuitry. Specific examples of suitable networks 104 may include one or more of the following networks: the worldwide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), one of the Institute for Electrical and Electronic Engineers (IEEE) 802 wireless networks, or any other wireless network. In other embodiments, network 104 may be a public switched telephone network (PSTN), a packet switched network (PSN), an intranet, the Internet, a local area network (LAN), or any other network known to persons of ordinary skill in the art.

The wireless communications system 100 may contain at least one source 112, which may or may not reside within the network 104. The source 112 may be a multicast source in that the source 112 delivers multicast data streams to the MN 102 via the CR 110, the PAR 106, and/or the NAR 108. Specifically, the source 112 may receive subscription requests from the MN 102, build multicast delivery trees, and send multicast data streams to the MN 102 via the multicast delivery trees. The source 112 may also engage in unicast or broadcast communications within the MN 102, as those terms are known in the art. In a specific embodiment, the source 112 provides a multicast multimedia content, such as IP television, streaming video, streaming audio, and the like to a plurality of the MNs 102.

The wireless communications system 100 may contain at least one agent 114, which may or may not reside within the network 104. The agent 114 may be a network element or functionality that aids in managing the MN 102, tunneling packets to other agents 114 in other networks 104, advertising locator or care-of addresses (CoA) that may serve as the termination point of a tunnel, maintaining current location information for the MN 102, managing identifier or home addresses (HoA) for the MN 102, and/or routing messages or data between the MN 102 and the source 112. In a specific embodiment, the PAR 106 may be a home AR, and the NAR 108 may be a foreign AR. In such an embodiment, the agent 114 associated with the PAR 106 may be a home agent (HA), and the agent 114 associated with the NAR 108 may be a foreign agent (FA).

The CR 110, PAR 106, and NAR 108 may be routers, bridges, switches, or any other devices that route data packets between various nodes. Specifically, the CR 110 may be a core node in that the CR 110 does not communicate directly with the MN 102. As such, the CR 110 may only communicate with nodes within the network 104, such as the PAR 106, the NAR 108, the source 112, and/or the agent 114. In contrast, the PAR 106 and NAR 108 may be fixed points that provide wireless access network coverage to the MN 102. In addition, the PAR 106 and/or the NAR 108 may be configured with at least one buffer and functionality that may be used to establish tunnels with other ARs 106, 108 and/or the MN 102. In a specific embodiment, the PAR 106 and NAR 108 may be the first IP router that the MN 102 encounters, such as a Broadband Remote Access Service (BRAS), a Media Access Gateway (MAG), or an Access Service Network Gateway (ASN-GW). Alternatively, the PAR 106 and NAR 108 may be Gateway General Packet Radio Service (GPRS) Support Nodes (GGSNs) in a 3GPP network or Packet Data Servicing Nodes (PDSNs) in a 3GPP2 network.

In an embodiment, the PAR 106 may be distinguished from the NAR 108 based on its temporal position in the handover of the MN 102. Specifically, the PAR 106 may be distinguished from the NAR 108 in that the PAR 106 is the MN's default router prior to handover, and the NAR 108 is the MN's default router after handover. In such a case, the MN 102 may have a previous care of address (PCoA) that is valid on the PAR's subnet, and may have a new CoA (NCoA) that is valid on the NAR's subnet. In a specific embodiment, the handover of the MN 102 is a fast handover for mobile IPv6 (FMIPv6).

In an embodiment, the CR 110, PAR 106, and NAR 108 may have multicast services capability. Multicast services capability is the ability of a router to build multicast delivery trees and/or forward multicast traffic to a multicast subscriber, such as the MN 102. While the CR 110, PAR 106, and NAR 108 may have the same multicast services capabilities, it is contemplated that the CR 110, PAR 106, and NAR 108 may have different multicast capabilities. For example, the CR 110, PAR 106, and/or NAR 108 may have different multicast capabilities because of different local policies, router processing capabilities, and so forth.

One or more of the components shown in FIG. 1 may be configured with a multicast listening state (MLS). The MLS may indicate the multicast groups to which a particular host is subscribed. For example, the MLS may comprise one or more records, where each record may contain an IPv6 multicast address, a filter mode, and a source list. The multicast host and a multicast router, e.g. the CR 110, PAR 106, and NAR 108, each maintain their MLSs per interface. As such, the MLSs in any of the multicast routers may be consolidated based on the MLS of each host at the same link. Thus, if two MNs 102 are in communication with the PAR 106 and are receiving the same multicast data stream, then the PAR 106 may maintain a single MLS for the multicast data stream.

The configuration of the MLS may depend on the network configuration. In a point-to-point link model, each link is allocated a separate, unique prefix or a set of unique prefixes by the AR 106, 108. In such a case, the MLS may be synchronized between the AR 106, 108 and the MN 102. That is, the AR 106, 108 may exactly know the MN's MLS through the multicast listener discovery (MLD) message exchange. In contrast, the MLS in the MN 102 differs from the MLS in the AR 106, 108 in the shared link model. As such, the AR 106, 108 may not exactly know the MN's MLS. Such is also the case when the MLD proxy is used between the MN 102 and the AR 106, 108.

Figure 2:
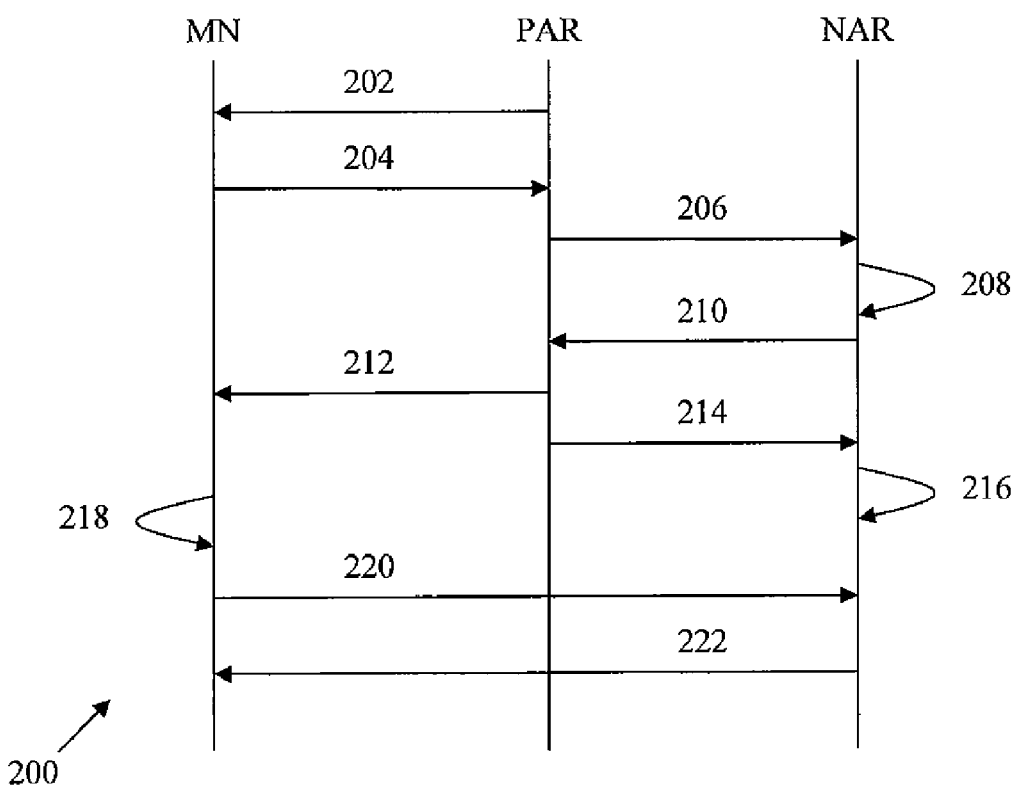
FIG. 2 is a protocol diagram of an embodiment of a method for multicast fast handover.

FIG. 2 is a protocol diagram of one embodiment of a method 200 for multicast fast handover. The method 200 collects the MN's MLS, allows for negotiation between the PAR and the NAR regarding the multicast services that the MN is subscribed to, and tunnels the multicast data streams from the PAR to the NAR during the handover. The method 200 may be characterized as a predictive mode of operation because the PAR and/or MN predict the NAR prior to handover. The method 200 may be implemented between the MN, the PAR, and the NAR anytime the MN, PAR, and/or NAR detect that a handover of the MN is likely or imminent.

The method 200 may begin with a MLS query at 202. Specifically, the PAR may send the MLS query to the MN whenever the PAR detects that a handover of the MN is likely or imminent. In an embodiment, the MLS query includes the designated multicast listener query (DMLQ) described herein. A MLS report may be sent in response to the MLS query at 204. The MLS report may contain the MN's MLSs and may include a multicast listener report defined in Internet Engineering Task Force (IETF) document RFC 3810 by Vida et al. entitled "Multicast Listener Discovery Version 2 (MLDv2) for IPv6" (hereinafter Vida), which is incorporated herein by reference as if reproduced in its entirety. In an alternative embodiment, the method 200 may begin with an unsolicited MLS report at 204. Specifically, the MN may send the unsolicited MLS report to the PAR when the MN detects an upcoming handover. In such an embodiment, there is no MLS query at 202. In another alternative embodiment, the PAR may have synchronized multicast state data with the MN or otherwise know the MN's multicast state data, and thus may not need to interact with the MN to obtain the MN's multicast state data.

In a specific embodiment, the MLS query and/or MLS response include the multicast address option defined in IETF document draft-suh-mipshop-fmcast-mip6-00 by Suh et al. and entitled "Fast Multicast Protocol for Mobile IPv6 in the Fast Handovers Environments" (hereinafter Suh), which is incorporated herein by reference as if reproduced in its entirety. In some situations, e.g. in proxy mobile IPv6 (PMIPv6), such a mechanism may not be applicable because there is not any mobility related signaling exchange between the MN and the AR or the MAG.

The method 200 may continue with a handover initiate (HI) at 206. The HI may be a message sent by the PAR to the NAR regarding the MN's handover. Specifically, the HI may provide the NAR with information related to the MN's multicast groups and/or initiate a multicast service negotiation between the PAR and NAR. The HI may include a multicast group information option (MGIO) described herein, and may be similar to the unicast handover messages defined in IETF document draft-ietf-mipshop-fmipv6-rfc4068bis-02 by Koodli entitled "Fast Handovers for Mobile IPv6" (hereinafter Koodli), which is incorporated by reference as if reproduced in its entirety.

The method 200 may continue with the evaluation of the MN's multicast subscriptions at 208. In evaluating the multicast subscriptions, the NAR may determine whether the MN's MLS defined in the HI is supported by the NAR. The determination may include checking the NAR's multicast state data to determine whether the NAR is already receiving one or more of the MN's multicast data streams. If the NAR is already receiving the MN's multicast data streams, the NAR may take steps to ensure that such multicast data streams are not dropped, e.g. if all of the other MN's subscribed to those multicast groups leave the NAR before the MN arrives. If the NAR is not receiving one or more of the MN's multicast data streams, the NAR may optionally determine whether it is able to receive those multicast data streams, and/or begin to build the multicast delivery tree, thereby obtaining the MN's multicast data streams.

The multicast delivery trees may be established using any known method. For example, in protocol independent multicast—sparse mode (PIM-SM), the AR sends a PIM join message to a router that is the root of the non-source-specific distribution tree for the multicast group, e.g. the CR 110 in FIG. 1. The join message then travels hop-by-hop towards the root router for the group, e.g. the source 112. As the join message travels through each router, the multicast delivery tree state for the group is instantiated at each router. Thus, when these routers receive the multicast data stream, they send the multicast data packets to the router from which they received the join message. As such, PIM-SM provides one known method for any router to build a multicast delivery tree. Other multicast delivery tree construction methods are known to persons of ordinary skill in the art.

Returning to FIG. 2, the method 200 may continue with a handover acknowledgement (HAck) message at 210. The HAck may be a message sent by the NAR to the PAR as a response to the HI. Specifically, the HAck message may provide the PAR with information related to the MN's multicast groups that the NAR does support and/or finalize the multicast service negotiation between the PAR and NAR. The HAck may include the MGIO described herein and may be similar to the unicast handover messages defined by Koodli. If the NAR is not a multicast router or does not support any of the MN's multicast subscriptions, the MGIO may be excluded from the HAck message.

The method 200 may continue with an MLS advertisement at 212. The PAR may use the MLS advertisement to inform the MN of the NAR's multicast service capability. For example, the MLS advertisement may include the MLS advertisement (MLSA) described herein. If some of the MN's multicast groups are not supported by NAR, the MN may terminate those multicast groups' sessions or revert to home subscription using a bi-directional tunnel between the MN and the HA.

The method 200 may continue with the tunneling of the multicast data stream at 214. Specifically, a tunnel between the PAR and NAR is established to carry the MN's multicast data streams. The tunnel may also carry the MN's unicast and/or broadcast data streams, if desired. The tunnel may be established using any known method, such as the method used to establish unicast data stream tunnels. Although a single tunnel may carry multicast data streams for multiple MNs, it may be preferred to build a single tunnel for each MN's multicast data streams so that the tunnel can be torn down or otherwise deconstructed after handover of the MN is complete. In a specific embodiment, a multicast tunnel timer is created when the tunnel is established, and the tunnel is torn down when the multicast timer expires, e.g. after a predetermined amount of time. The multicast timer should be sufficiently long to allow the NAR to join the appropriate multicast delivery trees. Alternatively, the NAR and/or PAR can detect when the MN is receiving its multicast data streams directly from the NAR, and tear down the tunnel at that time. Further in the alternative, the NAR and/or PAR may tear down the tunnel when the last of the multicast data packets are sent through the tunnel.

The encapsulated tunnel traffic may use the multicast data stream information in the encapsulation header. Generally, tunnel traffic is encapsulated with a header that is removed after the traffic exits the tunnel. The header may be a single layer or may be a plurality of layers, depending on the specific tunneling protocol used to establish the tunnel. When there is a single tunnel layer, the encapsulated multicast traffic may use the multicast source address as the inner source address, the multicast address as the inner destination address, the PAR's address as the outer source address, and the MN's new CoA as the outer destination address. Such may be the case for FMIPv6. Alternatively, there may be two tunnel layers. As such, the encapsulated multicast traffic may use the multicast source address as the inner source address, the multicast address as the inner destination address, the PAR's or previous MAG's proxy CoA as the medium source address, the MN's home address as the medium destination address, the PAR's or previous MAG's proxy CoA as the outer source address, and the NAR's or new MAG's proxy CoA as the outer destination address. Such may be the case for fast PMIPv6.

The method 200 may continue with the buffering of packets at 216. The NAR may buffer packets it receives from the PAR via the tunnel. If the NAR has established the multicast delivery trees for the MN, the NAR may also begin directly receiving multicast data streams for the MN, e.g. from the CR 110 in FIG. 1. Some multicast packets may be duplicated when the NAR receives multicast data streams both directly and through the tunnel from the PAR. The NAR may simply send all of the packets, duplicated or unique, to the MN and let the MN determine whether to drop the packets.

Returning to FIG. 2, the method 200 may continue when the MN disconnects from the PAR at 218. As used herein, the term "disconnect" includes any signaling or other actions that allow the MN to disconnect or otherwise disassociate from the PAR. The method 200 may continue when the MN connects to the NAR at 220. As used herein, the term "connect" includes any signaling or other actions that allow the MN to connect or otherwise associate with the NAR. Such signaling may include the MLS report described herein, or any other type of signaling that informs the NAR of the MN's MLS. If the NAR has not established the multicast delivery trees for the MN, it may do so upon receipt of such signaling.

The method 200 may conclude with the delivery of the multicast packets at 222. Specifically, the NAR may advertise the multicast services that it supports to the MN, and deliver the MN's multicast data streams to the MN. If the NAR has buffered some multicast packets for the MN, the NAR may deliver such packets on a first-in, first-out (FIFO) basis. The MN may also initiate its multicast signaling procedure using its NCoA. Once the NAR directly receives the MN's multicast data streams, the PAR may stop sending the MN's multicast data streams through the tunnel. The NAR and/or PAR may then tear down the tunnel or instruct the PAR to tear down the tunnel.

Figure 3:
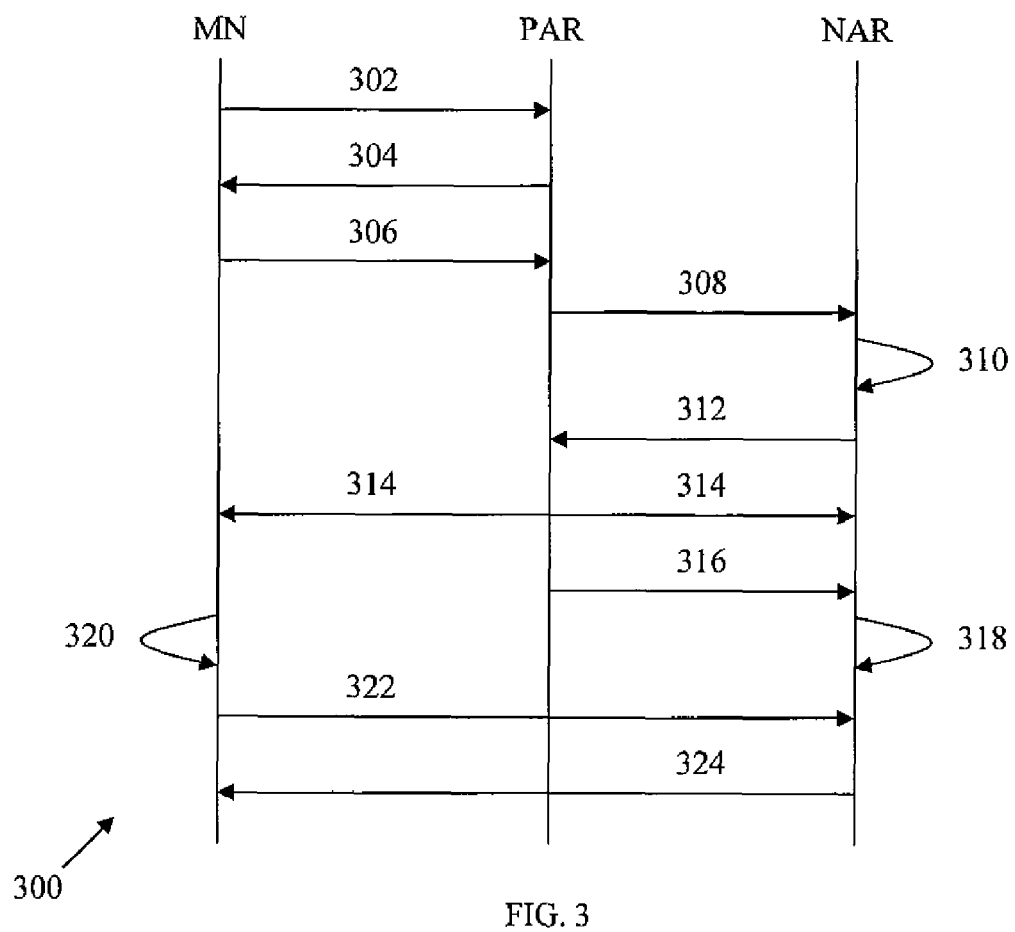
FIG. 3 is a protocol diagram of another embodiment of a method for multicast fast handover.

FIG. 3 is a protocol diagram of another embodiment of a method 300 for multicast fast handover. Similar to the method 200, the method 300 collects the MN's MLS, allows for negotiation between the PAR and the NAR regarding the multicast services that the MN is subscribed to, and tunnels the multicast data streams from the PAR to the NAR during the handover. Also similar to method 200, the method 300 may be characterized as a predictive mode of operation. However, the method 300 is unlike the method 200 in that the method 300 allows the MN to receive a fast binding acknowledgement (FBack) from the PAR. The method 300 may be implemented between the MN, the PAR, and the NAR anytime the MN, PAR, and/or NAR detect that a handover of the MN is likely or imminent.

The method 300 may begin with a router solicitation for proxy advertisement (RtSolPr) at 302. The RtSolPr may be a message from the MN to the PAR requesting information for a potential handover. The method 300 may continue with a proxy router advertisement (PrRtAdv) at 304. The PrRtAdv may be a message from the PAR to the MN that provides information about neighboring links that facilitate expedited movement detection and/or acts as a trigger for network-initiated handover. The RtSolPr and PrRtAdv may allow the MN to formulate a prospective NCoA and learn some information about the NAR.

The method 300 may continue with a fast binding update (FBU) at 306. The FBU may be a message from the MN to the PAR instructing the PAR to redirect the MN's traffic toward the NAR. The purpose of the FBU may be to authorize the PAR to bind the PCoA to the NCoA so that arriving packets can be tunneled to the new location of MN, e.g. via the NAR. The FBU may contain the MN's multicast state data, if desired. The method 300 may continue with a HI at 308, the evaluation of the MN's MLS at 310, and the HAck at 312, which may be substantially the same as described above.

The method 300 may continue with the FBack at 314. The FBack may be a message from the PAR to the MN that informs the MN of the NCoA and/or instructs the MN to disconnect from the PAR. The FBack may also be sent to the NAR to confirm the use of the NCoA and/or inform the NAR that the MN is disconnecting from the PAR. The method 300 may continue with the tunneling of the MN's traffic at 316, buffering of the MN's traffic at 318, and disconnection of the MN from the PAR at 320, which may be substantially the same as described above.

The method 300 may continue with a fast neighbor advertisement (FNA) at 322. The FNA may be a message from the MN to the NAR to announce its connection to the NAR. The FNA may also confirm the use of NCoA when the MN did not receive an FBack. Finally, the method 300 may conclude with the delivery of the MN's packets at 324, which may be substantially the same as described above.

Figure 4:
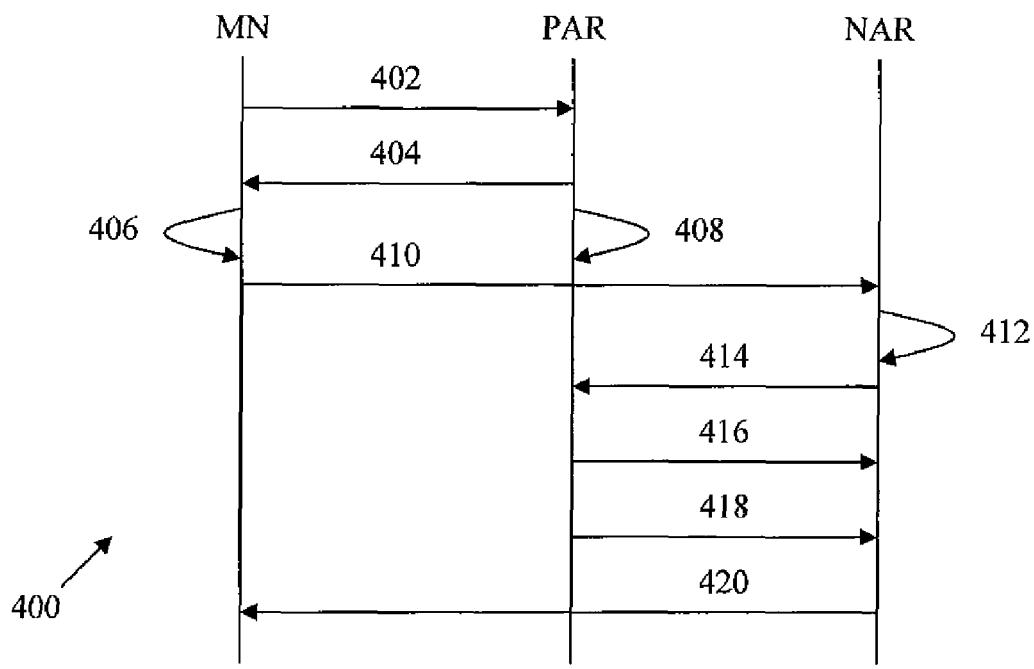
FIG. 4 is a protocol diagram of another embodiment of a method for multicast fast handover.

FIG. 4 is a protocol diagram of another embodiment of a method 400 for multicast fast handover. Similar to the methods 200 and 300, the method 400 tunnels the multicast data streams from the PAR to the NAR during the handover, but only after the MN has connected with the NAR. In addition, the MN does not receive the FBack from the PAR or send any of the MN's multicast state data prior to handover. Thus, the method 400 may be characterized as a reactive mode of operation. The method 400 may be implemented between the MN, the PAR, and the NAR anytime the MN, PAR, and/or NAR detect that a handover of the MN is likely or imminent.

The method 400 may include an RtSolPr 402, a PrRtAdv 404, and a MN disconnection from the PAR at 406, all of which may be substantially the same as described above. However, when the MN disconnects from the PAR at 406, the PAR buffers the MN's multicast traffic at 408. The PAR buffering may be substantially the same as the NAR buffering described above. In addition, the MN may send a FBU to the NAR when the MN connects to the NAR at 410. The FBU may be encapsulated in a FNA and include the MGIO described herein. The NAR may then evaluate the MN's MLS at 412 and send a FBU to the PAR at 414. The PAR then may send an FBack 416 to the NAR. The evaluation of the MN's MLS, the FBU, the FNA, and the FBack are substantially the same as described above.

The NAR then establishes a tunnel to the NAR and delivers the buffered multicast packets to the NAR at 418. The PAR then establishes a tunnel to the MN and delivers the related multicast traffic to the MN at 420. The establishment of both tunnels is substantially the same as described above. Substantially simultaneous with the establishment of the tunnel at 420, the MN may initiate multicast signaling with the NCoA. Once the NAR has constructed the multicast delivery trees, the NAR may deliver multicast traffic directly to the MN and tear down the PAR-NAR tunnel as described above.

Figure 5:
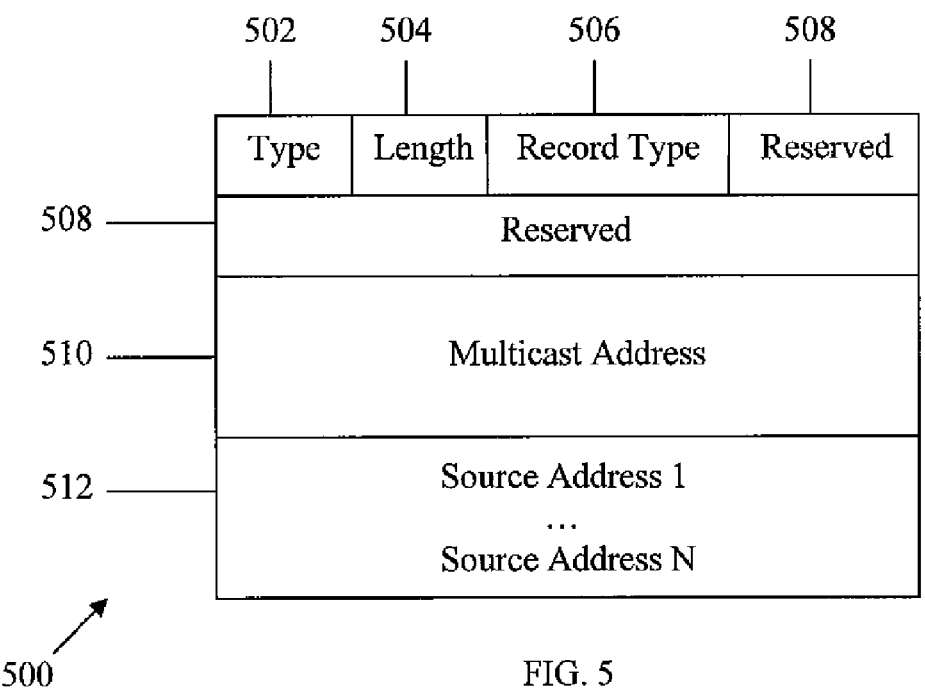
FIG. 5 is a schematic diagram of an embodiment of a multicast group information option.

FIG. 5 illustrates an embodiment of the MGIO 500, which may be an FMIPv6 extension. As described above, at least one MGIO 500 may be included in the FBU, HI, and/or HAck messages, thereby enabling multicast context transfer and multicast service negotiation. For example, the PAR may collect the MLS from the MN, and send the multicast context to the NAR using a MGIO in the HI. In addition, the NAR may reply with supported multicast service using MGIO in the HAck. A plurality of the MGIOs can be included in HI and HAck messages, if desired.

The MGIO 500 may comprise a type field 502, a length field 504, a record type field 506, at least one reserved field 508, a multicast address field 510, and/or a source address field 512. The type field 502 may be defined by the user, be about 8 octets long, and/or begin at the first octet of the MGIO 500. The length field 504 may be a variable option that defines the length of the MGIO 500, be about 8 octets long, and/or begin at the $9^{th}$ octet of the MGIO 500. The record type field 506 may refer to the type of the multicast address record, be about 8 octets long, and/or begin at the $17^{th}$ octet of the MGIO 500. Various address record types are defined in Vida. The reserved fields 508 may be reserved for other uses, initialized to zero by the sender, ignored by the recipient, be about 8, about 32, or about 40 octets long, and/or begin at the $25^{th}$ octet of the MGIO 500. The multicast address field 510 may specify the multicast group address, be about 32 or 128 octets long, and/or begin at the $65^{th}$ octet of the MGIO 500. The source address field 512 may specify a vector of N unicast addresses of the senders of this multicast group where N is the number of unicast addresses, be about n*32 octets long where n is an integer, and/or begin at the $193^{rd}$ octet of the MGIO 500.

Figure 6:
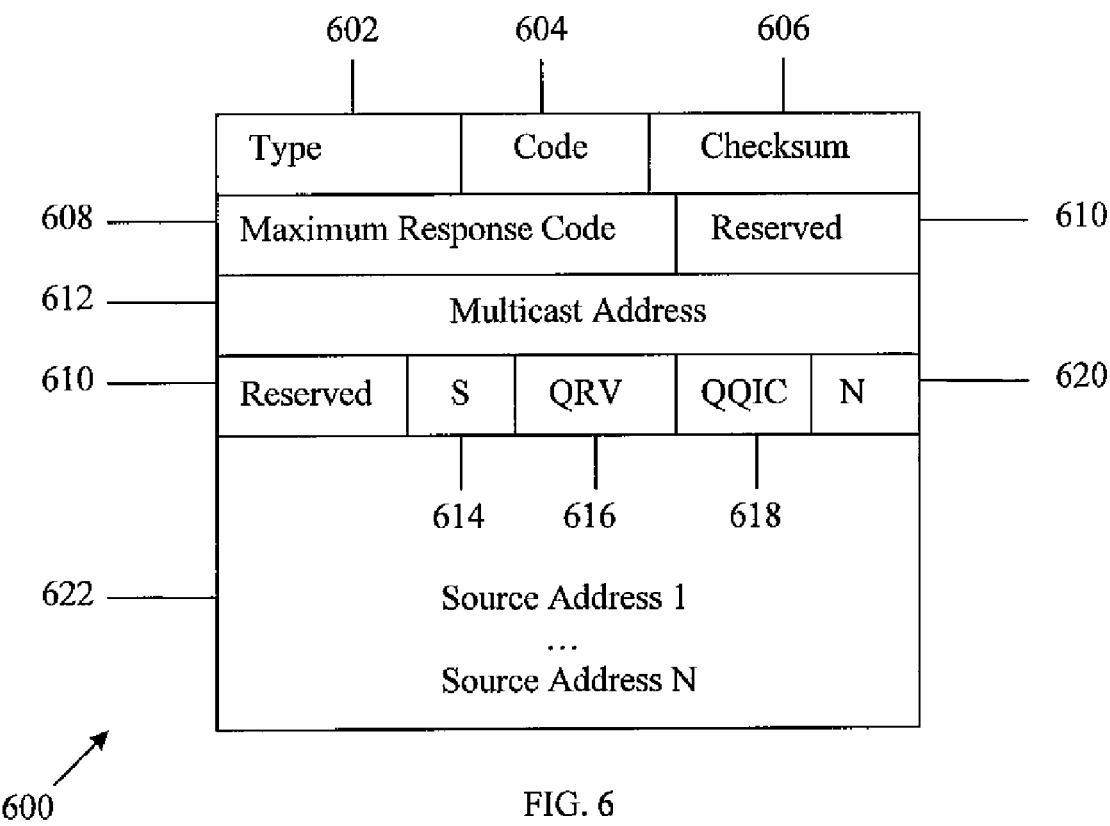
FIG. 6 is a schematic diagram of an embodiment of a designated multicast listener query.

FIG. 6 illustrates an embodiment of the DMLQ 600, which may be used as an MLDv2 extension. As described above, a multicast router may send the DMLQ 600 to the MN for its MLS. The DMLQ 600 has the same format as the other queries defined in Vida, namely the general query, the multicast address specific query, and the multicast address and source specific query.

The DMLQ 600 may comprise a type field 602, a code field 604, a checksum field 606, a maximum response code field 608, at least one reserved field 610, a multicast address field 612, an S flag 614, a querier's robustness variable (QRV) field 616, a querier's query interval code (QQIC) field 618, an N field 620, and/or a source address field 622. The type field 602 may be defined by the user, be set to type=130, be about 8 octets long, and/or begin at the first octet of the DMLQ 600. The code field 604, checksum field 606, maximum response code field 608, and reserved field 610 may have the same meaning as defined in Vida. Specifically, the code field 604 may be initialized to zero by the sender, ignored by receivers, be about 8 octets long, and/or begin at the $9^{th}$ octet of the DMLQ 600. The checksum field 606 may be a standard Internet Control Message Protocol version 6 (ICMPv6) checksum covering the entire MLDv2 message plus a "pseudo-header" of IPv6 header fields, be about 16 octets long, and/or begin at the $17^{th}$ octet of the DMLQ 600. The maximum response code field 608 may specify the maximum time allowed before sending a responding report, be about 16 octets long, and/or begin at the $65^{th}$ octet of the DMLQ 600. The reserved fields 610 may be reserved for other uses, initialized to zero by the sender, ignored by the recipient, be about 4, about 16, or about 24 octets long, and/or begin at the $49^{th}$ octet of the DMLQ 600.

The S flag 614, QRV field 616, and/or QQIC field 618 may be used for synchronizing the operation between different multicast routes with the same link, and are defined in Vida. The S flag 614 may indicate to any receiving multicast routers that they have to suppress the normal timer updates they perform upon hearing a query, be about one octet long, and/or begin at the $5^{th}$ octet after the multicast address field 612. The QRV field 616 may contain the robustness variable value used by the querier, be about three octets long, and/or begin at the sixth octet after the multicast address field 612. The QQIC field 616 may specify the query interval used by the querier, be about 8 octets long, and/or begin at the $9^{th}$ octet after the multicast address field 612. In an embodiment, the S flag 614, QRV field 616, and/or QQIC field 618 may not be necessary because the message is unicast and other multicast routers cannot receive the message. In such a case, the S flag 614, QRV field 616, and/or QQIC field 618 may be set to zero.

The multicast address field 612 may be set to zero so that the MN can report its MLSs, be about n*32 octets long where n is an integer, and/or begin at the $129^{th}$ octet of the DMLQ 600. The N field 620 may represent the number of sources, be set to zero, be about 16 octets long, and/or begin 17 octets after the multicast address field 612. The source address field 622 may specify a vector of N unicast addresses of the senders of this multicast group where N is the number of unicast addresses, be about n*32 octets long where n is an integer, and/or begin at the $193^{rd}$ octet of the DMLQ 600. In an embodiment, the DMLQ 600 is sent with a valid IPv6 link-local source address, and the destination address field contains any valid unicast address for the MN.

Figure 7:
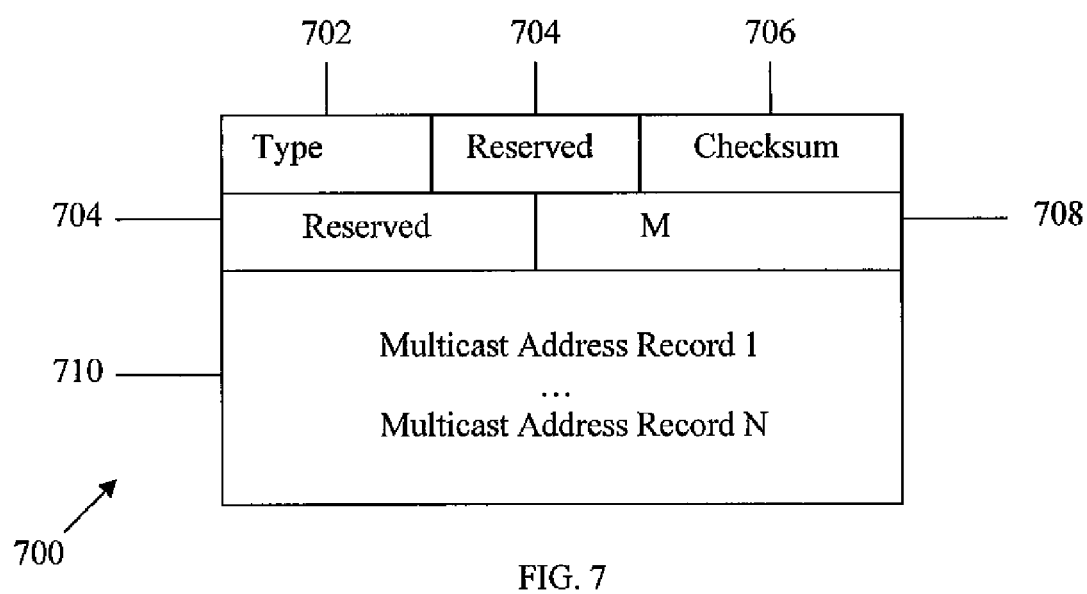
FIG. 7 is a schematic diagram of an embodiment of a multicast listening state advertisement.

FIG. 7 illustrates an embodiment of the MLSA 700, which may also be used as an MLDv2 extension. The MLSA 700 may be sent by multicast routers to advertise available multicast services for the MN. The format of the MLSA 700 is similar to multicast listener report message defined in Vida.

The MLSA 700 may comprise a type field 702, at least one reserved field 604, a checksum field 706, an M field 708, and/or a multicast address field 710. The type field 702 may be allocated by Internet Assigned Numbers Authority (IANA) or defined by the user, set to type=143, be about 8 octets long, and/or begin at the first octet of the MLSA 700. The reserved field 704 and the checksum field 706 may have the same meaning as defined in Vida. Specifically, the reserved fields 704 may be reserved for other uses, initialized to zero by the sender, ignored by the recipient, be about 8, about 16, or about 24 octets long, and/or begin at the $9^{th}$ octet of the MLSA 700. The checksum field 704 may be a standard ICMPv6 checksum covering the entire MLDv2 message plus a "pseudo-header" of IPv6 header fields, be about 16 octets long, and/or begin at the $17^{th}$ octet of the MLSA 700. The M field 708 may specify the number of multicast address records present in the report, be about 16 octets long, and begin about the $49^{th}$ octet of the MLSA 700. Finally, the multicast address field 710 may contain the multicast groups' information that the MN can subscribe to on the link from which the advertisement is sent.

The methods described herein may have various advantages. When a MN moves from PAR to NAR, the overall multicast handover time consists of link layer (L2) delays, network layer (L3) connection delays, and multicast signaling delays. This relationship may be defined as follows:

Handover time=L2 delay+L3 network connection delays+ multicast signaling delays The L2 delays are well known in the art and may be unavoidable and/or relatively fixed. In contrast, the L3 network connection delays, including delays associated with default router discovery, CoA configuration, and duplicate address detection, and the multicast signaling delays, including delays associated with joining multicast groups and constructing multicast delivery trees, may be variable and can be reduced by the methods described herein. Specifically, the handover delay may be reduced by buffering the related multicast traffic in the NAR. In addition, the MN can finish the network connection before the link layer handover through the RtSolPr and PrRtAdv interactions described herein. Finally, older delivery trees can be used before new delivery trees are constructed by using the tunnel between the PAR and the NAR. As such, the overall handover time is reduced. In addition, the buffering at the PAR or NAR and the tunneling of the multicast data stream packets to the MN may allow the MN to miss fewer or receive substantially all of the multicast packets during handover. Finally, the use of the various previously defined signals, which are modified as described herein, allows the PAR to send the NAR the MN's multicast state data without using any specialized mobility signaling.

Although the embodiment illustrated above is described in terms of IPv6, persons of ordinary skill in the art will appreciate that the present disclosure is applicable to IPv4 as well. Specifically, the MLD as described herein is intended to include an Internet Group Management Protocol (IGMP), FMIPv6 as described herein is intended to include fast mobile IPv4 (FMIPv4), and the IPv6 multicast traffic as described herein is intended to include IPv4 traffic. Persons of ordinary skill in the art will be aware of other aspects of the present disclosure that may be applied to IPv4.

Figure 8:
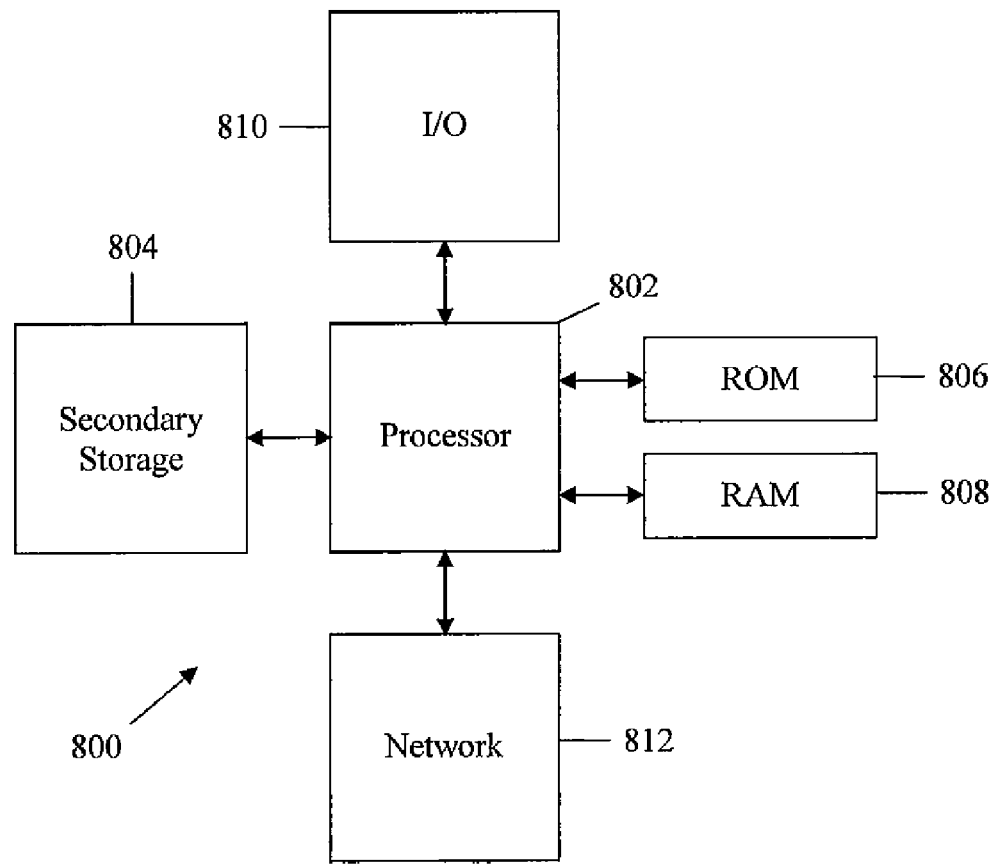
FIG. 8 is a schematic diagram of an embodiment of a general-purpose computer system.

The network described above may be implemented on any general-purpose network component, such as a computer or network component with sufficient processing power, memory resources, and network throughput capability to handle the necessary workload placed upon it. FIG. 8 illustrates a typical, general-purpose network component suitable for implementing one or more embodiments of a node disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A first access router (AR) comprising:
   a processor configured to send a multicast listening state (MLS) query to a mobile node (MN), wherein the MLS query comprises a designated multicast listener query;
   the processor configured to receive a multicast state data for the MN receiving multicast data streams;
   the processor configured to evaluate the multicast state data;
   the processor configured to indicate whether the multicast state data is supported by the first AR;
   the processor configured to establish a tunnel with a second access router; and
   the processor configured to receive at least one multicast data stream associated with the multicast state data from the second access router via the tunnel,
   wherein the processor configured to evaluate the multicast state data comprises:
      the processor configured to determine a multicast listening state (MLS);
      the processor configured to compare the MLS to the multicast state data; and
      the processor configured to build a multicast delivery tree for any multicast state data that is not present in the MLS.

2. The first AR of claim 1, wherein the processor is further configured to buffer the multicast data stream until communication is established between the first AR and the MN.

3. The first AR of claim 1, wherein the processor is further configured to receive a second multicast data stream associated with the multicast delivery tree.

4. The first AR of claim 3, wherein the multicast data stream and the second multicast data stream are the same data stream.

5. The first AR of claim 1, wherein the multicast data stream received via the tunnel is supported by the first AR.

6. The first AR of claim 1, wherein the MN is a multicast subscriber configured to receive multicast data streams.

7. The first AR of claim 1, wherein the processor configured to indicate whether the multicast state data is supported by the first AR comprises:

the processor configured to indicate whether the multicast state data is supported by a multicast service capability of the first AR.

8. The first AR of claim 1, wherein the multicast service capability of the first AR is a capability to build multicast delivery trees and forward multicast traffic to the multicast subscriber MN.

* * * * *